United States Patent
Byren et al.

(10) Patent No.: US 6,849,841 B2
(45) Date of Patent: Feb. 1, 2005

(54) SYSTEM AND METHOD FOR EFFECTING HIGH-POWER BEAM CONTROL WITH OUTGOING WAVEFRONT CORRECTION UTILIZING HOLOGRAPHIC SAMPLING AT PRIMARY MIRROR, PHASE CONJUGATION, AND ADAPTIVE OPTICS IN LOW POWER BEAM PATH

(75) Inventors: Robert W. Byren, Hermosa Beach, CA (US); Alvin F. Trafton, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 90 days.

(21) Appl. No.: 09/965,929

(22) Filed: Sep. 28, 2001

(65) Prior Publication Data

US 2003/0062464 A1 Apr. 3, 2003

(51) Int. Cl.⁷ .................................................. G01J 1/20
(52) U.S. Cl. ................................. 250/201.9; 250/201.1
(58) Field of Search ............................ 250/201.1, 201.9, 250/216, 227.14, 550; 356/121

(56) References Cited

U.S. PATENT DOCUMENTS

| | | |
|---|---|---|
| 4,016,415 A | 4/1977 | O'Meara |
| 4,326,800 A | 4/1982 | Fitts |
| 4,724,404 A | 2/1988 | Cochran |
| 4,734,911 A | 3/1988 | Bruesselboch |
| 4,798,462 A | 1/1989 | Byren |
| 4,831,333 A | 5/1989 | Welch |
| 5,018,835 A | 5/1991 | Dorschner |
| 5,042,922 A | 8/1991 | Pepper |
| 5,090,795 A | 2/1992 | O'Meara et al. |
| 5,093,740 A | 3/1992 | Dorschner |
| 5,093,747 A | 3/1992 | Dorschner |
| 5,126,869 A | 6/1992 | Dorschner et al. |
| 5,253,033 A | 10/1993 | Lipchak |
| 5,274,479 A | 12/1993 | Shen et al. |
| 5,483,342 A | 1/1996 | Rockwell |
| 5,694,408 A | 12/1997 | Bott et al. |
| 5,946,130 A | 8/1999 | Rice |

OTHER PUBLICATIONS

Tyson and Ulrich, "Adaptive Optics", The Infrared and Electro-Optical Handbook, vol. 8, Chapter 2, ERIM, Ann Arbor, MI, pp. 167–172, (1963).

Golnick, "Directed Energy Systems", The Infrared and Electro-Optical Handbook, vol. 8, Chapter 5, ERIM, Ann Arbor, MI, pp. 405–408, 423–446, (1963).

(List continued on next page.)

*Primary Examiner*—Edward J. Glick
*Assistant Examiner*—Courtney Thomas
(74) *Attorney, Agent, or Firm*—John E. Gunther; Leonard A. Alkov; William C. Schubert (57) ABSTRACT

A beam control system and method. In an illustrative embodiment, the inventive system (500) provides a first beam of electromagnetic energy (503); samples the first beam (503) and provides a second beam (505) in response thereto; detects aberrations in the second beam (505); and corrects aberrations in the first beam (503) in response to the detected aberrations. In a specific implementation, the invention (500) includes a beam director telescope (510) having a primary mirror (516) on which a holographic optical element (518) is disposed. The holographic optical element (518) samples the output high-power beam and provides a sampled beam to a wavefront sensor (520). The wavefront sensor (520) provides signals to an adaptive optics processor (580). The adaptive optics processor (580) analyzes the sampled wavefront, detects aberrations therein and provides a correction signal to an optical phased array (550).

19 Claims, 4 Drawing Sheets

OTHER PUBLICATIONS

Basov et al, "Inversion of Wavefront in SMBS of a Depolarized Pump," JTEP Lett. vol. 28, No. 4, pp. 197–201, Aug. 1978.

Betin, Matthews, and Mangir, "Vector Phase Conjugation with Loop Laser Geometry," CLEO '97 Proceedings, Paper No. CTuL4, pp. 102–103, (1997).

E. Treacy, "Optical Pulse Compression with Diffraction Gratings," IEEE J. of Quantum Electronics, vol. QE–5, No. 9, p. 454, Sep. 1969.

Compensated Imaging by Real–Time Holography with Optically Addressed Liquid–Crystal Spatial Light Modulators, by M. Gruneisen, K. Peters, and J. Wilkes, published in SPIE vol. 3143, 0277–768X, pp. 171–181, (1997).

Atmospheric–turbulence Compensation with Self Referenced Binary Holographic Interferometry, by S. Ma, D. Guthals, P. Hu, and B. Campbell, published in the J. Optical Soc. Am. A, vol. 11, No. 1, pp. 428–433, (1994).

G. Golnick, "Directed Energy Systems", The Infrared and Electro–Optical Handbook, vol. 8, Chapter 5, ERIM, Ann Arbor, MI, pp. 441–442 (1993).

White Light Imaging using Large Numerical Aperture Telescope with Dynamic Holographic Correction for Primary Mirror Distortions, by M. Vasil, V. Berenberg, A. Leschev, P. Semenov, and V. Venediktov, published in SPIE Conference of Artificial Turbulence for Imaging and Wave Propagation, San Diego, CA, SPIE vol. 3432, 0277–768X, pp. 164–170, (1998).

SYSTEM AND METHOD FOR EFFECTING HIGH-POWER BEAM CONTROL WITH OUTGOING WAVEFRONT CORRECTION UTILIZING HOLOGRAPHIC SAMPLING AT PRIMARY MIRROR, PHASE CONJUGATION, AND ADAPTIVE OPTICS IN LOW POWER BEAM PATH

BACKGROUND OF THE INVENTION

1. Field of the Invention

The present invention relates to optics. More specifically, the present invention relates to systems and methods for directing and correcting high-power beams of electromagnetic energy.

2. Description of the Related Art

Directed energy weapons and specifically high-energy laser (HEL) weapons are being considered for variety of military applications with respect to a variety of platforms, e.g., spaceborne, airborne and land based systems to name a few. These weapons generally involve the use of the laser or other source of a high-energy beam to track and destroy a target. To achieve mission objectives, directed energy weapons must be accurately steered and optimally focused. Steering involves line-of-sight control while focusing, with respect to HEL weapons, involves wavefront error correction. Currently, wavefront error correction is typically achieved using adaptive optics. The current state of the art in laser beam control adaptive optics requires placing one or more deformable mirrors within the highest intensity portion of the beam path. The conventional deformable mirror is typically a large element with a thin face sheet and a number of piezoelectric actuators. Actuators are located behind the face sheet and push and pull on the surface thereof to effect the deformation required to correct wavefront errors in an ongoing beam. The size of the active region of the deformable mirror must accommodate the full size of the high power laser beam in the high power Coudé path prior to expansion via an output telescope.

In addition, one or more fast (high temporal bandwidth) steering mirrors may be used to correct for tilt and direct the line-of-sight. A lower-bandwidth course gimbal may also be employed to correct for line-of-sight errors as well. A plurality of wavefront sensors are typically employed along with an aperture sharing element (ASE). The ASE allows a single optical path and aperture to be advantageously used for both the low power sensors and the high power output beam, ensuring that the corrected path is the same as that taken by the high power beam.

Unfortunately, the use of delicate optical devices in the path of a high-power energy beam is problematic. This is due to the fact that the high-energy the beam will heat and distort the optical element unless the element is actively cooled or has a coating with a very low optical absorption coefficient. The most durable coatings require a high temperature application process. Deformable mirrors are typically coated after the face sheet is bonded to the actuators, which limits the maximum temperature to which the deformable mirror assembly may be exposed without degrading the bond. Therefore, coatings may need to be applied at lower than optimal temperature using more complex coating processes, thereby reducing durability and/or increasing manufacturing cost.

In addition, conventional adaptive optics systems using deformable mirrors are limited in performance. Conventional deformable mirrors systems are limited with respect to the speed at which the mirror drive signals are computed and the reaction speed of the deformable mirror mechanism to correct for aberrations. There is also a limitation with respect to the number actuators that can be used. The number of actuators that may be used determines the resolution or "order" of the mirror. The stroke of the conventional deformable mirror is limited. "Stroke" relates to the amount of mirror surface deflection that may be achieved before either the piezoelectric actuators exceed their dynamic range or the face sheet begins to fail. Further, a conventional continuous face sheet deformable mirror cannot correct for a pathology in the spatial phase pattern, such as a branch point or an abrupt phase discontinuity. A branch point is a "singularity" in a deeply scintillated phase pattern caused by atmospheric turbulence over a long propagation path in which the phase monotonically increases around a zero amplitude point like a corkscrew, thereby requiring an abrupt $2\pi$ phase correction within the spatial phase pattern. Abrupt phase discontinuities may be caused by the optical discontinuities between segments of a multi-segment primary mirror.

In U.S. Pat. No. 5,694,408, issued Dec. 2, 1997, (the teachings of which are incorporated herein by reference), Bott, Rice, and Zediker appear to disclose a scheme which allows the deformable element to be placed in the low intensity region between a master oscillator and an array of fiber power amplifiers. The approach is to pre-distort the phase of the oscillator beamlets after separation in a distribution network and before injection into the fiber amplifier array, such that the pre-distortion corrects both the piston error between the individual fibers and optical aberrations in the atmosphere. However, this scheme is practical only with a coherently-combined array of single-mode fiber amplifiers, as each fiber channel is correctable in piston only, not high order. Also, this scheme is not applicable to multi-mode laser media such as large core fiber amplifiers or bulk media lasers as contemplated for weapon class HEL devices and may not be scaleable to high power levels due to random, high frequency phase noise caused by pump-induced temperature fluctuations within the fibers.

In U.S. Pat. No. 5,090,795, issued Feb. 25, 1992, the teachings of which are incorporated herein by reference, O'Meara and Valley appear to disclose several related schemes for using a liquid crystal light valve (LCLV) in a self-correcting adaptive optics system. This approach, however, places the LCLV in the high power beam path and is therefore limited by the damage susceptibility of the liquid crystal material.

To be effective and affordable, a space based Laser HEL beam director, for example, may have a lightweight primary mirror that is larger than the shroud diameter of the launch vehicle. This requires a mirror design that is collapsible during launch and deployable upon release in orbit. Such a deployable segmented mirror will have significant figure and static and dynamic piston phase errors due to the low stiffness pedals and physical arrangement of the deployment mechanism.

A method has been developed for sensing the outgoing wavefront error in a primary mirror that uses holographic optical elements (HOEs) fabricated on the primary mirror surface, see for example G. Golnick, "Directed Energy Systems", *The Infrared and Electro-Optical Handbook*, Volume 8, Chapter 5, ERIM, Ann Arbor, Mich., pp 441–442 (1993) for a description of primary mirror wavefront sampling using holographic optical elements. This wavefront sensing approach has also been applied to large segmented primary mirrors for space applications. The adaptive optics subsystem designs, to date, utilize the sampled outgoing wavefront from these HOEs, but close a conventional servo-loop around conventional continuous face sheet deformable mirrors which are inserted in the Coudé path of the high power beam. Unfortunately, this approach is limited by the performance of conventional deformable mirror technology, particularly the limited stroke and inability to accommodate discontinuities in phase created by the pedal joints. This approach requires that the segmented optical element maintain absolute phase and limited segment-to-segment tilt to remain within the control capability of the deformable mirror.

In U.S. patent application Ser. No. 09/965,764, filed Sep. 28, 2001 by R. W. Byren and A. F. Trafton and entitled SYSTEM AND METHOD FOR EFFECTING HIGH-POWER BEAM CONTROL WITH ADAPTIVE OPTICS IN LOW POWER BEAM PATH, the teachings of which are incorporated by reference herein, Byren and Trafton describe several beam control architectures which use the wavefront reversal property of nonlinear phase conjugation to place a photonic deformable element in a low-power master oscillator beam path to perform the adaptive optic correction primarily for tactical HEL applications. Unfortunately, while effective when integrated local- and target-loop adaptive optics are used, this architecture does not adequately address the needs of current and proposed space based applications.

Accordingly, a need remains in the art for a system and method for effecting outgoing wavefront sampling and correction for space based and other HEL applications.

SUMMARY OF THE INVENTION

The need in the art is addressed by the beam control system and method of the present invention. In an illustrative embodiment, the inventive system provides a first beam of electromagnetic energy; samples the first beam and provides a second beam in response thereto. The system then detects aberrations in the second beam and corrects aberrations in the first beam in response to the detected aberrations.

In a specific implementation, the invention includes a beam director telescope having a primary mirror on which a holographic optical element is disposed. The holographic optical element samples the output high-power beam and provides a sampled beam to a wavefront sensor. The wavefront sensor provides signals to an adaptive optics processor. The adaptive optics processor analyzes the sampled wavefront, detects aberrations therein and provides a correction signal to an optical phased array. Consequently, the output beam is compensated for the optics of the system, including the beam director telescope.

A master oscillator provides a low power reference beam, which illuminates the optical phased array and provides a beam-path wavefront error corrected signal in response thereto. After sampling the refractive distortion in the aperture sharing element (ASE) the beam-path wavefront error corrected signal illuminates the back of the ASE and back reflects off the front surface of the element. This signal, in turn, is conjugated by the first phase conjugate mirror and transmitted through the ASE to the second phase conjugate mirror. The second phase conjugate mirror conjugates the transmitted signal thus canceling the effect of the first phase conjugation process. This signal is then amplified and front reflected off the front surface of the ASE to provide the output beam to the beam director telescope, where it is directed to the target. As the front and back reflections off the front surface of the aperture sharing element are phase conjugates of one another, the reflective distortion due to this element, which is not shared by the target track sensor optical path, is removed. Refractive distortions, which are not shared by the target track sensor optical path such as in the aperture sharing element, laser amplifiers, and other optical elements are also removed in this embodiment via the wavefront reversal properties of the first and second phase conjugate mirrors. The residual optical distortions in the laser beam path from the master oscillator output to the target are, therefore, essentially the same as the optical distortions from the target to the target track sensor; and the correction signal applied to the optical phased array also corrects the beam path for the target track sensor.

Hence, the invention provides an integrated phase conjugate laser and adaptive optics control architecture that does not require target loop wavefront sensing and employs outgoing wavefront sampling of the primary beam director mirror. The invention integrates an outgoing wavefront sensing function within a novel beam control architecture that (1) extends the local loop compensation to include the beam director telescope and (2) does not require an active target loop adaptive optics function in order to correct for the outgoing wavefront errors. This is particularly important for the SBL mission where the range to the target is very long and target motion during the round trip transit time of photons is significant compared to the correlation distance for atmospheric disturbances. For this application, the target loop and outgoing wavefront corrections should be independent.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present teachings will be made clear with an initial review of the following.

Compensated Imaging by Real-Time Holography with Optically-Addressed Liquid-Crystal Spatial Light Modulators Several groups have demonstrated aberration correction for large primary mirrors and atmospheric turbulence using real-time holographic techniques that are based on optically-addressed spatial light modulators (OASLMs) (See for example "Compensated Imaging by Real-Time Holography with Optically Addressed Liquid-Crystal Spatial Light Modulators," by M. Gruneisen, K. Peters, and J. Wilkes, published in SPIE Vol. 3143, 0277-768X, pp. 171–181, (1997); "White Light Imaging using Large Numerical Aperture Telescope with Dynamic Holographic Correction for Primary Mirror Distortions," by M. Vasil, V. Berenberg, A. Leschev, P. Semenov, and V. Venediktov, published in *SPIE Conference of Artificial Turbulence for Imaging and Wave Propagation*, San Diego, Calif., SPIE Vol. 3432, 0277-768X, pp. 164–170, (1998); and "Atmospheric-turbulence Compensation with Self Referenced Binary Holographic Interferometry," by S. Ma, D. Guthals, P. Hu, and B. Campbell, published in the *J. Optical Soc. Am. A*, Vol. 11, No. 1, pp. 428–433, (1994).)

Figure 1:
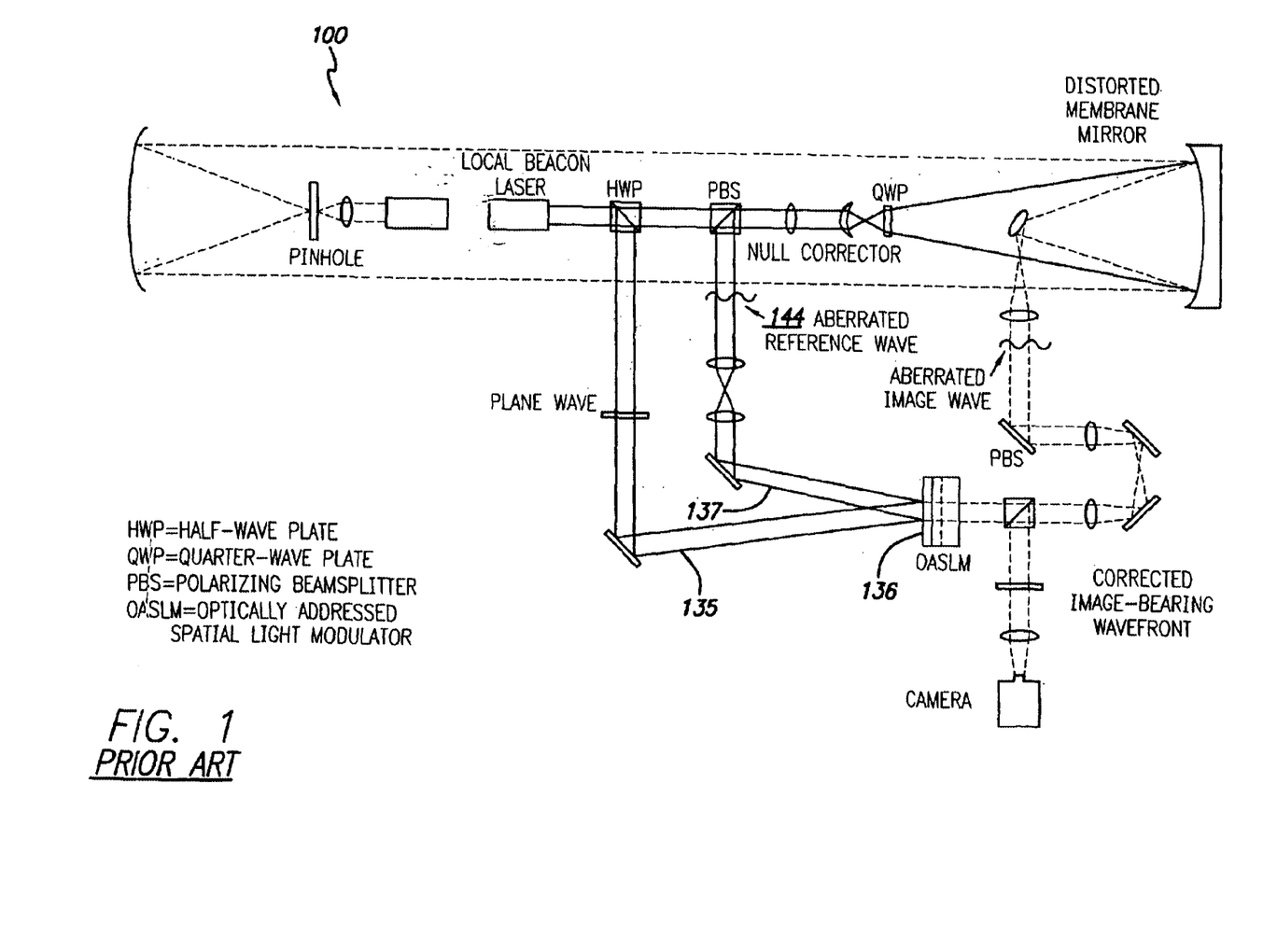
FIG. 1 is a diagram of a beam control system implemented in accordance with conventional teachings showing primary mirror aberration correction using holographic phase subtraction in an optically addressed spatial light modulator.

The system shown in FIG. 1 is representative of the work done by Gruneisen, Peters, and Wilkes and others in this field. In this embodiment 100, an optical aberration is recorded on an Optically Addressed Spatial Light Modulator (OASLM) 136 with a pair of laser beams. One beam 135 has a plane wave phase profile and serves as the "reference" beam. The other 137 has a phasefront on which is encoded the aberration 144 of the distorting element to be corrected. These beams are caused to interfere at the OASLM 136 and the resulting dark and light interference fringes are detected by a photo-sensitive layer (photo-conductor or photodiode) within the OASLM 136, which converts the optical fringes into an electric field profile. In holography, this is known as the "read" process. The spatially varying electric field then "writes" the interference pattern onto a nematic or ferro-electric liquid crystal layer, which responds to the varying field profile by reorienting the direction of the molecules of the liquid crystal material. This re-orientation of the liquid crystal layer changes the phase (nematic liquid crystals) or polarization (ferroelectric electric crystals) of a "write" beam passing through it.

A reflective layer, disposed between the photo-sensitive layer and the liquid crystal layer, isolates the photo-sensitive surface and allows the "write" beam to double-pass the liquid crystal, thereby encoding its phase or polarization with the interference pattern recorded in the liquid crystal layer. A polarizer/analyzer configuration (not shown) may be used with ferroelectric liquid crystals to convert polarization modulation into phase modulation. In the Figure, the "write" beam is the distorted beam from the telescope and the corrected beam is the first-order diffracted beam from the OASLM 136 which is also reflected by the OASLM's internal reflective layer. A detailed description of this "holographic phase subtraction" process, the experimental apparatus, the OASLM device and tradeoffs, and the empirical data is provided by Gruneisen, et al., in the reference and is not repeated herein.

The holographic aberration correction techniques known in the art provide a very powerful means for implementing an adaptive optics loop without the complexity and latency associated with an electronic adaptive optics processor. While useful for correcting aberrations in low-power systems, this approach is not readily adapted for aberration correction when high power lasers are used.

Wavefront Sampling Using Holographic Optical Elements

In U.S. Pat. No. 4,326,800, entitled "Laser Beam Wavefront and Line of Sight Correction," John Fitts discloses an auto-alignment system and wavefront correction system for high-energy lasers that uses "a primary mirror that is grated to diffract a low energy holographic replica of the high energy beam." The auto-alignment and wavefront control systems described in this patent are otherwise conventional and not repeated herein. This approach requires that conventional deformable optical elements such as continuous face sheet deformable mirrors be placed in the high power beam path to correct the outgoing wavefront, and therefore imposes all the limitations inherent in these elements, as described later.

Integrated Phase Conjugate Laser and Adaptive Optics Architecture

Figure 2:
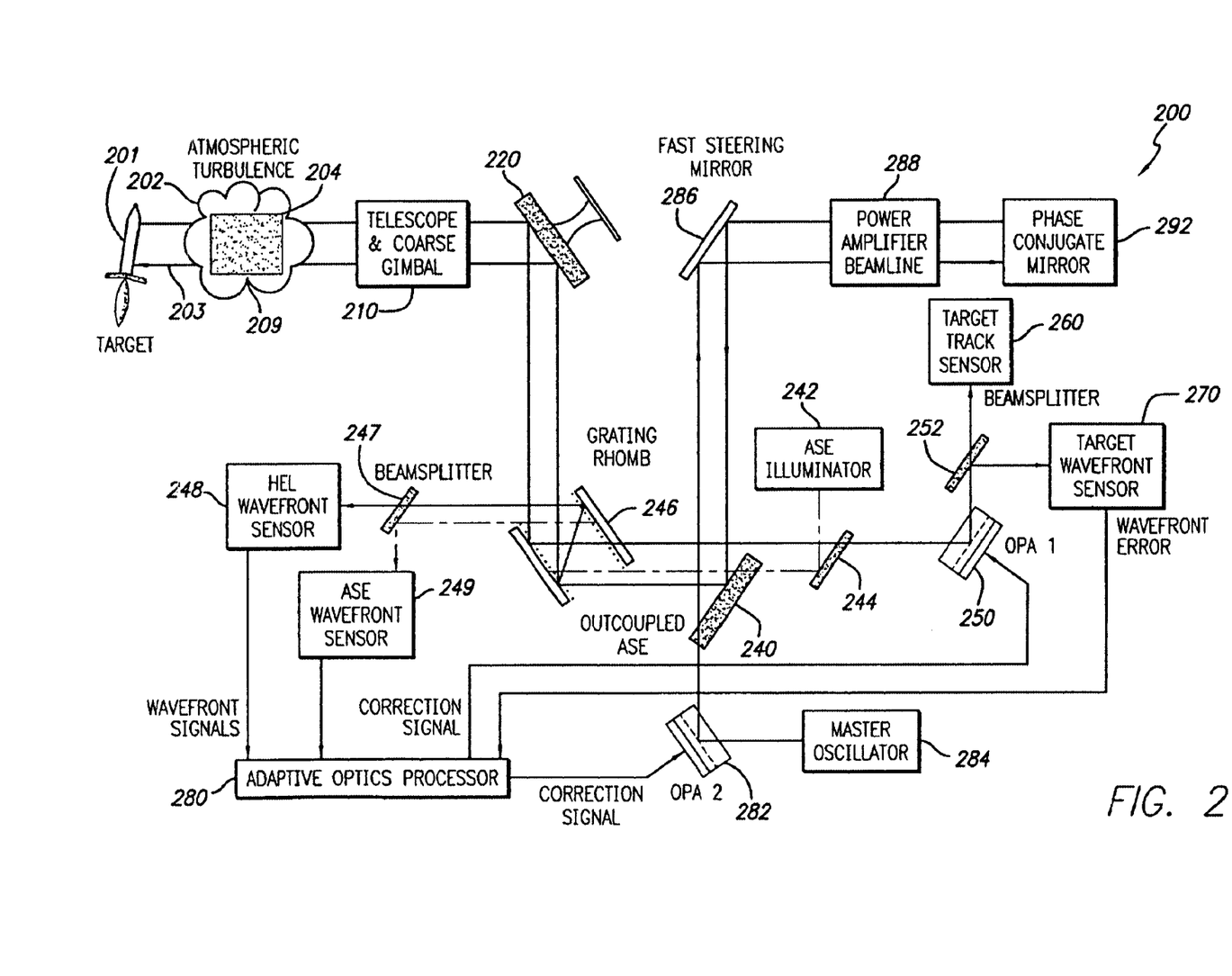
FIG. 2 is a diagram of a beam control system showing an integrated phase conjugate laser and adaptive optics architecture using grating Rhomb for local loop wavefront sampling and photonic wavefront correction in low power target loop and master oscillator beam paths in accordance with the teachings of the above-referenced application of Byren et al.

FIG. 2 shows an implementation of a high energy laser (HEL) beam control architecture implemented in accordance with the teachings of the above-referenced patent application of Byren et al. (Ser. No. 09/965,764, filed Sep. 28, 2001) the teachings of which have been incorporated herein by reference herein. As discussed more fully in the referenced patent, this system 200 uses the wavefront reversal properties of nonlinear optical phase conjugation to allow photonic spatial phase modulators (e.g., optical phased arrays) to be placed within low power portions of the beam path to effect an adaptive optic correction of target and local loop wavefront errors. In this scheme, aberrations within a master oscillator beam path and the non-common path errors within an Outcoupler and Aperture Sharing Element (Outcoupler/ASE) 240 are sampled with a Grating Rhomb 246 and sensed by a pair of Wavefront Sensors, one 248 for the HEL and one 249 for the Outcoupler/ASE.

In this scheme, the functions of an HEL outcoupler and aperture sharing element have been combined in a single optical element (Outcoupler/ASE) 240, eliminating one of the high power transmissive optics normally required in such a system. An Adaptive Optics Processor 280 uses the wavefront error from a Target Wavefront Sensor 270 to close a servo-loop around a photonic spatial light modulator (which may be an Optical Phased Array (OPA) 250 or a micro electromechanical system (MEMS)), which nulls the wavefront error at the Target Wavefront Sensor 270 and corrects the target track sensor image. A reference phasefront for the Outgoing HEL Beam 203 is calculated by subtracting the phase profile determined from the wavefront signal measured by the ASE Wavefront Sensor 249 from the phase correction applied to OPA 1 (250). The Adaptive Optics Processor 280 then closes a second servo loop around OPA 2 (282) to drive the phasefront measured at the HEL wavefront sensor 248 to be identical with the reference phasefront thus calculated. When this loop is properly closed, the HEL Output Beam 203 will have the correct pre-distortion to compensate for the atmospheric turbulence, without phasefront artifacts due to the non-common paths through the ASE/Outcoupler 240 or the power amplifier phase conjugate leg (Power Amplifier 288 and Phase Conjugate Mirror 292).

In this approach, the Target Wavefront Sensor 270 is always operated near null, ensuring that the adaptive optics performance will remain good even under low signal-to-noise ratio (SNR) conditions. Only the high signal-to-noise ratio HEL Wavefront Sensor 248 and ASE Wavefront Sensor 249 are operated off-null. Both (250) and OPA 2 (282) are driven in a closed-loop fashion. For some applications, the Adaptive Optics Processor 280 may also compute the correct pre-distortion signal using deterministic or stochastic estimation techniques known in the art, which may be designed to counteract latency in the sensed wavefronts (feed forward), offsets between the location of the wavefront sensing illumination beacon on the target and the desired aimpoint, and other effects. For most adaptive optics applications, it is advantageous to place the deformable elements and wavefront sensors at pupil points within the optical path. This ensures good mapping of the sensed wavefront error to the pixels of an OPA used to correct this error. Pupil relay optics may therefore be employed in the optical path, which are not shown in the figure. For most adaptive optics applications, it is also advantageous to operate the refractive beamsplitting elements located within the high power beam path, such as the ASE and Outcoupler, at relatively small angles of incidence (angle between surface normal and incident ray). Unfortunately, while effective when integrated local- and target-loop adaptive optics are used, this architecture does not adequately address the needs of current satellite based laser (SBL) applications.

Figure 3:
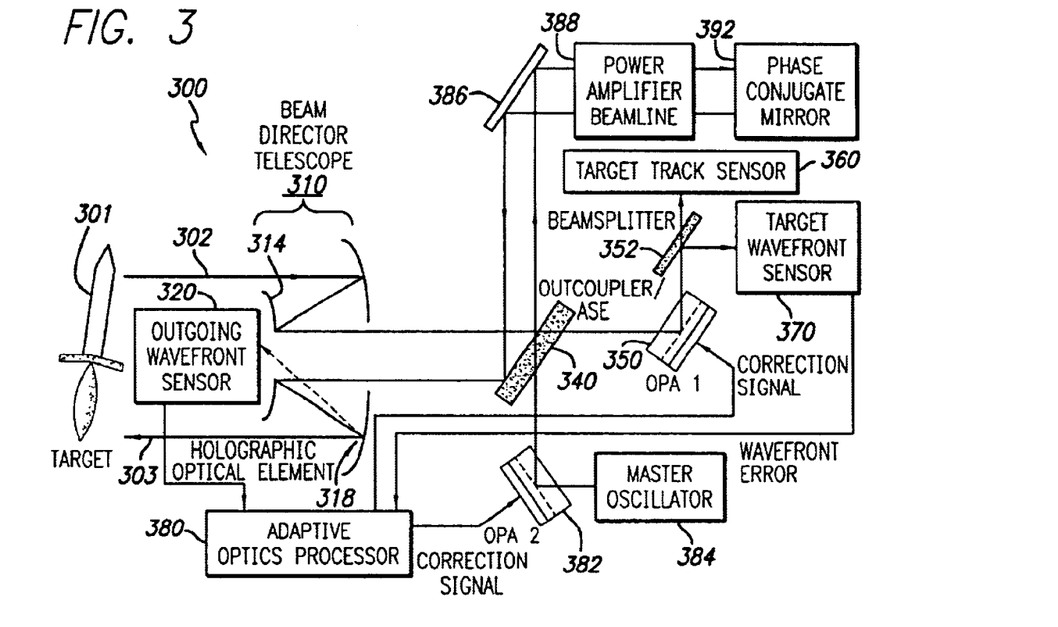
FIG. 3 is a diagram of a beam control system implemented in accordance with the teachings of the present invention showing an independent target loop and outgoing wavefront correction utilizing holographic sampling at a primary mirror, phase conjugation, and adaptive optics in low power beam path.

FIG. 3 shows an exemplary embodiment of a beam control system implemented in accordance with the teachings of the present invention, which also includes an independent target loop adaptive optics function. This architecture 300 is similar to the prior art scheme in that the functions of the HEL outcoupler element and aperture sharing element have been combined into one optic 340 and that two OPAs 350, 382 are used to correct for the wavefront errors in the local and target loops. This approach differs substantially, however, from the approach mentioned above in two respects. First, the local loop and target loop adaptive optics functions are totally independent. Second, the outgoing wavefront from the HEL beam is sampled on the output side of a Beam Director Telescope 310 using Holographic Optical Elements (HOEs) 318 which are fabricated directly on a Primary Mirror 316 thereof. For segmented and/or deployable primary mirrors, as envisioned for an objective space based HEL system, each pedal of the Primary Mirror 316 should have one or more HOEs to measure both the figure errors within a segment and the piston errors between segments. The piston errors are not correctable with a conventional continuous face sheet deformable mirror due to the abrupt phase discontinuities. However, non-mechanical photonic spatial phase modulators such as OPAs and micro electromechanical systems (MEMS), because they can accommodate abrupt phase discontinuities of arbitrary magnitude, are ideally suited to solve this outgoing wavefront correction problem with deployable and/or segmented mirrors.

Because the outgoing wavefront correction function is independent from the target loop, it will not compensate for wavefront disturbances beyond the beam director telescope. Fortunately for space-based missile defense applications, the wavefront disturbances in the target loop are minimal due to the lack of a dense intervening atmospheric path and the fact that phase errors near the target have minimal effect on the Strehl ratio of the HEL beam. The speed of the target and the length of the beam path are such that the atmospheric disturbances measured by an active target loop wavefront sensor would not correlate with the disturbances encountered by the HEL beam near the target. For this reason, an independent outgoing wavefront correction function is advantageous.

Relative motion between the target and host platform may require a lead angle to be included in the HEL pointing function. This may be accomplished with the outgoing wavefront correction loop by nulling the outgoing wavefront sensor signal to a fixed tilt reference signal. This function may be implemented optically if an interferometer-based Outgoing Wavefront Sensor 320 is used, such as a lateral shearing interferometer, by controlling the tilt of an attendant independent reference beam (not shown), or may be implemented within the Adaptive Optics Processor 380 in software. In either implementation, an angular offset signal is applied to OPA 2 (382) which deflects the master oscillator signal entering the phase conjugate leg, thereby causing the high power laser beam to be deflected in order to effect the desired lead angle.

Figure 4:
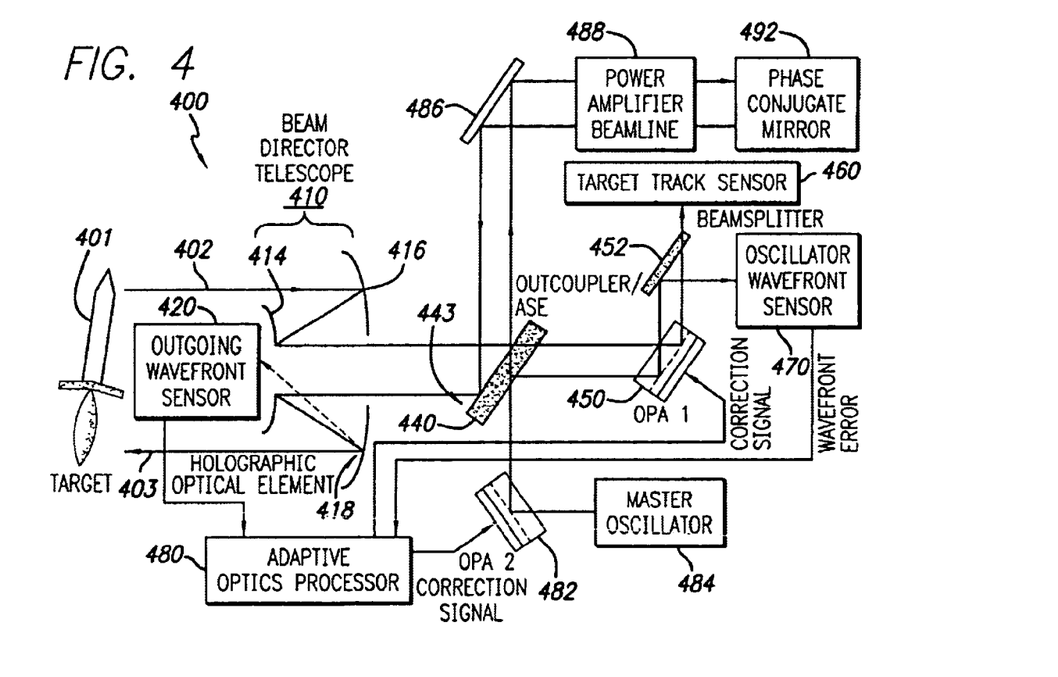
FIG. 4 is a diagram of a beam control system implemented in accordance with the teachings of the present invention showing an outgoing wavefront correction utilizing holographic sampling at primary mirror, phase conjugation, and adaptive optics in low power beam path with no target loop wavefront correction.

FIG. 4 shows another embodiment of the invention in which the target loop wavefront correction function is eliminated and a non-common path correction loop is added to the target track sensor path. Correction for the HEL outgoing wavefront is the same as in FIG. 3, wherein OPA 2 (482) is commanded by the Adaptive Optics Processor 480 to null the outgoing phasefront error sensed by the outgoing wavefront sensor to zero. When this servo-loop is closed, the phasefront of the master oscillator signal entering the Outcoupler/ASE 440 will have the unconjugated figure and piston errors associated with the Primary Mirror 416 as well as the phase conjugate of the vertical refractive non-common path error in the Outcoupler/ASE 440. The refractive error is taken out when the master oscillator beam passes vertically through the Outcoupler/ASE 440. The unconjugated figure and piston errors of the Primary Mirror 416 are conjugated within the PCM 492 and are corrected upon reflection off the Primary Mirror 416 to produce the desired plane-wave output beam.

Correction of the Target Track Sensor 460 image for the refractive component of non-common path error in the Outcoupler/ASE 440 is accomplished as follows. The conjugated vertical component of refractive non-common path error in the Outcoupler/ASE 440 is eliminated as the master oscillator beam passes vertically up through the Outcoupler/ASE 440 after reflection off OPA 2 (482). At this point a small portion of this beam is back reflected off the front surface 443 of the Outcoupler/ASE 440 and picks up the horizontal component of refractive non-common path error in this element. The reflected master oscillator signal then reflects off OPA 1 (450) where it is transformed into a plane wave at the oscillator wavefront sensor by the Adaptive Optics Processor 480 servo. In nulling the aberrations in the master oscillator signal, OPA 1 (450) will be configured to correct for the distortion in the Primary Mirror 416 as well as the horizontal refractive distortion in the Outcoupler/ASE 440. Because these are the same distortions seen by the Target Track Sensor 460, the target image will also be corrected by OPA 1 (450) for best tracking performance. Note that by nulling the phasefront sensed by the Oscillator Wavefront Sensor 470 to a fixed tilt rather than zero, the Adaptive Optics Processor 480 can introduce a fixed tracking offset or lead angle as required to offset the effects of relative target motion described earlier.

Correction for the warped-surface reflective component of non-common path error in the Outcoupler/ASE 440 is accomplished as follows. For the HEL output beam sensed by the Outgoing Wavefront Sensor 420 to be free of any warped-surface distortion from the Outcoupler/ASE, the amplified beam from the power amplifier phase conjugate leg (Power Amplifier 488 and Phase Conjugate Mirror 492) prior to front reflecting off the front surface 443 of the Outcoupler/ASE 440 must contain the phase conjugate of this front reflected, front surface distortion. The master oscillator beam entering the amplifier beamline must therefore be pre-distorted via OPA 2 (482) with the unconjugated phasefront so that the HEL beam is in the proper phase relationship after transformation by the Phase Conjugate Mirror 492. The portion of the master oscillator beam that is back reflected off the front surface of the Outcoupler/ASE does not have any component of warped-surface distortion because the back reflected distortion is the phase conjugate of the front reflected distortion, and the two perfectly cancel. The Oscillator Wavefront Sensor (470), therefore, does not sense this reflective non-common path component and it is not corrected by OPA 1 (450). The result is that the warped-surface reflective component of non-common path Outcoupler/ASE error, which is not seen by the Target Track Sensor 460, is not included in the correction for the Target Track Sensor's beam path and therefore does not adversely affect its performance.

FIGS. 3 and 4 were drawn showing the sampled beam from the HOEs entering the Outgoing Wavefront Sensor through a hole in the secondary mirror of the beam director telescope. Wavefront sampling could also be accomplished, within the scope of the present teachings, by reflecting the beam sampled from the Primary Mirror off the Secondary Mirror and by using a beamsplitter or other means to split the beams in the Coudé path behind the telescope. This approach may be advantageous where the size and weight of the secondary mirror mount and overall balance are important.

Figure 5:
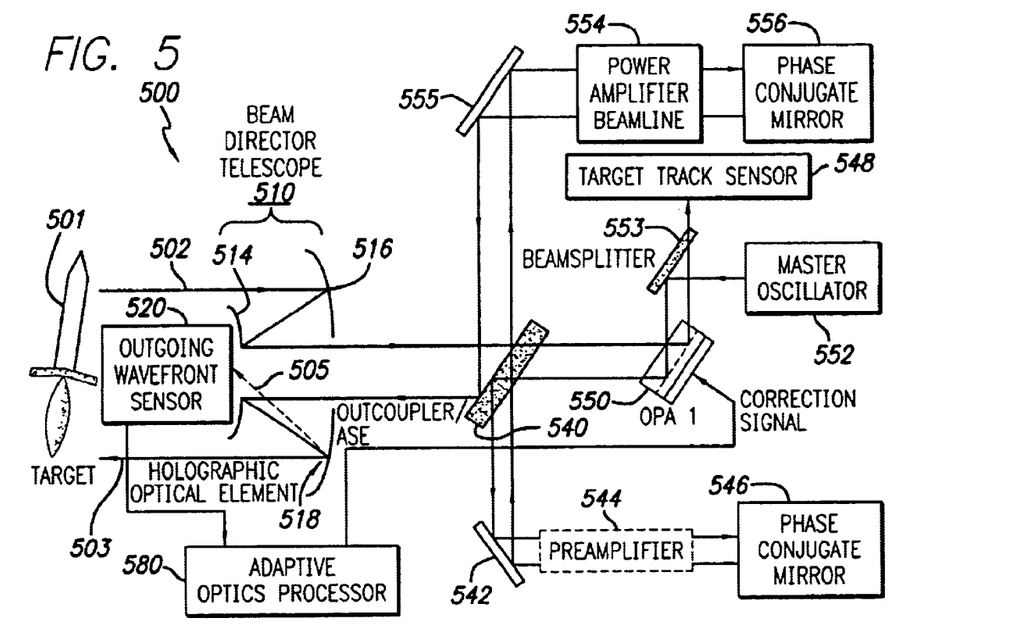
FIG. 5 is a diagram of a preferred embodiment of a beam control system implemented in accordance with the teachings of the present invention showing outgoing wavefront control utilizing two phase conjugate legs.

FIG. 5 shows a preferred embodiment of the invention. In the embodiment 500 of FIG. 5, non-common path error correction is accomplished with a second phase conjugate leg, thereby eliminating the Oscillator Wavefront Sensor, OPA 2, and a portion of the functionality of the Adaptive Optics Processor, utilized in FIGS. 3 and 4. In this embodiment, the Master Oscillator 552 is moved to the Oscillator Wavefront Sensor 470 location in FIG. 4; and both OPA 2 (482) and the Master Oscillator 484 thereof are replaced by a second Phase Conjugate Mirror 546. A Preamplifier 544 may be used in the second phase conjugate leg to overcome reflective losses in the Outcoupler/ASE 540 on the vertical beam path from the second phase conjugate leg up to the first leg containing a Power Amplifier Beamline 554. This HEL architecture may have cost and complexity advantages for certain system configurations.

In this embodiment, outgoing wavefront sampling and sensing are identical to those described with reference to FIG. 4, however, the outgoing wavefront correction loop is closed around OPA 1 (550), not OPA 2. Correction for the non-common path error in the Outcoupler/ASE 540 follows the same general approach described earlier, but with some differences as discussed below. The Master Oscillator 552 is first reflected off a Beamsplitter 553 then off OPA 1 (550), where it picks up the conjugate of the telescope distortion as well as the conjugate of the horizontal portion of the refractive component of non-common path error in the ASE/Outcoupler 540. The beam is then transmitted through the Outcoupler/ASE 540 to the font surface at which point the error associated with the horizontal refractive non-common path error is corrected. The beam then picks up the warped-surface distortion from the Outcoupler/ASE 540 by back-reflecting off the front surface of this element. Finally, it passes down through the Outcoupler/ASE 540 picking up the vertical refractive component of non-common path error before entering the second phase conjugate leg at the bottom of the figure.

The beam then enters the second phase conjugate leg where it may be preamplified and where the optical phasefront is reversed upon reflection by the second Phase Conjugate Mirror 546. The beam exiting this leg now carries the unconjugated atmospheric distortion as well as the conjugate of the vertical refractive distortion and the conjugate of a back-reflection off the front surface of the Outcoupler/ASE 540. By passing up vertically through the Outcoupler/ASE 540, the vertical refractive component of non-common path error is corrected. The beam is then conjugated in the first phase conjugate leg at the top of the figure by a second Phase Conjugate Mirror 556 and amplified by a Power Amplifier Beamline 554. At this point, the beam carries only the conjugated atmospheric distortion and the unconjugated back reflection off the front surface of the Outcoupler/ASE 540. As described before, this second component is the same as the conjugate of a front-reflection off the font surface, which is corrected when the beam front-reflects off the front surface of the Outcoupler/ASE on its way to the Beam Director Telescope 510. Upon reflecting off the Outcoupler/ASE 540, the HEL beam carries only the conjugate of the telescope distortion, which is the desired phasefront to correct for this aberration and deliver a near plane wave beam toward the Target 501.

Because the high power laser beam follows the line of sight of the master oscillator beam, the high power beam may be desirably offset from the target aimpoint by steering the master oscillator beam with mechanical means (e.g., steering mirror) or non-mechanical means (additional OPA), not shown.

Figure 6:
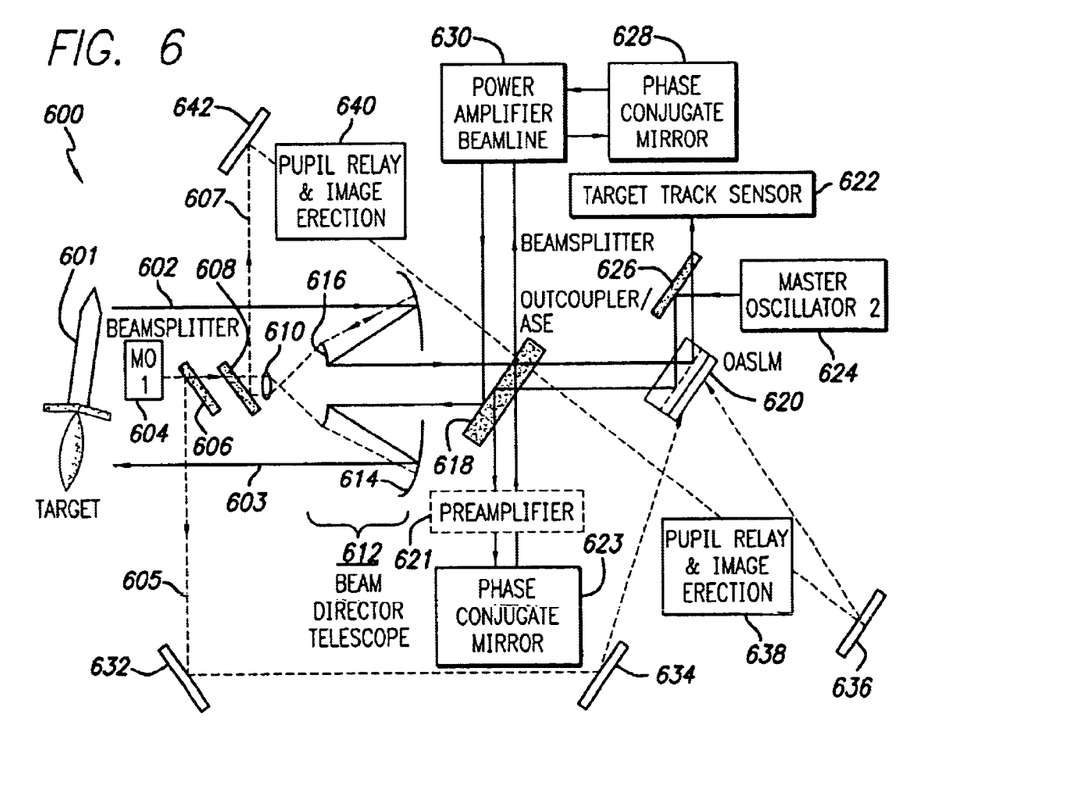
FIG. 6 is a diagram of a beam control system implemented in accordance with the teachings of the present invention showing outgoing wavefront correction utilizing real-time holography and phase conjugation.

FIG. 6 shows another embodiment of the invention. This embodiment 600 incorporates an Optically-Addressed Spatial Light Modulator (OASLM) 620 and "read" beam mechanism, in place of the Outgoing Wavefront Sensor 520, OPA 1 (550), and the Adaptive Optics Processor 580 of FIG. 5. In this embodiment, there are no bandwidth-limiting electrical servo systems and therefore the adaptive optics correction can be very fast with very high resolution. The penalty is the optical complexity associated with coherent interferometry, as required to record a real-time hologram containing the phasefront distortions, potential boresight registration errors associated with payload structural compliance (which may require separate auto-alignment loops in the "read" beam paths), and potentially imperfect sampling of the horizontal refractive non-common path errors in the Outcoupler/ASE 618.

In this embodiment, a single-mode Master Oscillator (MO 1 (604) in FIG. 6) is used to generate two beams. The first 605 is generated as a reflection off a First Beamsplitter 606 and serves as the reference beam in the holographic "read" process. The transmitted portion passes through a Second Beamsplitter 608 and is injected through Null-Corrector Optics 610 into a Beam Director Telescope 612, where it samples the distortion of the Primary Mirror 614, returns through the null corrector, and is reflected by the Second Beamsplitter 608. Sampling of the Primary Mirror 614 may be accomplished using holographic optical elements as discussed earlier or as a specular reflection off the primary mirror surface, as shown in the figure. If a specular reflection is used, the Null-Corrector Optics 610 must be separated from the Primary Mirror 614 by a distance approximately equal to the base radius of curvature of the Primary Mirror, requiring an extension of the telescope structure substantially beyond the Secondary Mirror 616. The beam carrying the telescope distortion is then caused to pass through the Outcoupler/ASE 618 such that it samples the horizontal refractive portion of non-common path error. Pupil Relay and Image Erection Optics 638, 640 are used before and after the Outcoupler/ASE 618 to transform (re-image) and register (align) the beam relative to the refractive distortion.

As in the prior art description (see FIG. 1), the two beams are caused to interfere at the OASLM 620, recording the phasefront distortion of the Primary Mirror 614 in an interference pattern. This interference pattern produces fringes of high and low optical intensity within a photo-sensitive layer, which in turn produces electric field variations in response to the optical fringes. A liquid crystal layer records the pattern in the orientation of its molecules, which alter the phase or polarization of transmitted optical radiation depending on the nature of the liquid crystal material. The distortion information is thereby recorded in a real-time hologram within the liquid crystal layer. As in the prior art, a reflective layer between the photo-sensitive layer and the liquid crystal layer causes incident light to double-pass the liquid crystal layer and the resultant first order diffracted beam has a phasefront that is the phase conjugate of the primary mirror distortion. The OASLM 620 serves the same function as OPA 1 in FIG. 5 and the correction of non-common path errors in the Outcoupler/ASE 618 is the same as above. Because sampling holographic optical elements and OASLMs are wavelength dependent, the best performance is achieved with this embodiment when the MO 1 (604) beam and the high power laser beam are of the same or nearly the same wavelength.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A beam control system comprising:
   first means for providing a first beam of electromagnetic energy;
   second means for sampling said first beam at an output of said first means and providing a second beam in response thereto;
   third means for detecting aberrations in said second beam; and
   fourth means, responsive to said detected aberrations, for correcting aberrations in said first beam, said fourth means including adaptive optical means with a phase conjugate amplifier beamline for predistorting said first beam to correct for said aberrations.

2. The invention of claim 1 wherein said first means includes a beam director.

3. The invention of claim 2 wherein said beam director is a telescope.

4. The invention of claim 3 wherein said telescope includes a primary mirror.

5. The invention of claim 4 wherein said second means includes a holographic optical element.

6. The invention of claim 5 wherein said holographic optical element is disposed on a surface of said primary mirror of said telescope.

7. The invention of claim 1 wherein said third means is a wavefront sensor adapted to detect said aberrations in said second beam and provide a first error signal in response thereto.

8. The invention of claim 7 wherein said fourth means includes a processor adapted to generate a correction signal in response to said error signal.

9. The invention of claim 8 further including means for generating a reference beam.

10. The invention of claim 9 further including means for modifying said reference beam in response to said correction signal.

11. The invention of claim 10 wherein said means for modifying is an optical phased array.

12. The invention of claim 10 further including means for conjugating the phase of said reference beam and providing said first beam in response thereto.

13. The invention of claim 12 further including an aperture sharing element disposed in alignment with said means for conjugating.

14. The invention of claim 13 wherein said modified reference beam is adapted to read a first surface of said aperture sharing element and provide a back side read beam in response thereto.

15. The invention of claim 14 wherein said means for conjugating includes a first phase conjugate mirror adapted to conjugate the phase of said back side read beam and provide a conjugated back side read beam in response thereto.

16. The invention of claim 15 wherein said means for conjugating includes a second phase conjugate mirror adapted to conjugate the phase of said back side read beam and provide said back side read beam in response thereto.

17. The invention of claim 15 further including means for amplifying said back side read beam output by said second phase conjugate mirror to provide said first beam.

18. The invention of claim 17 wherein said first beam is reflected by a front surface of said aperture sharing element.

19. A beam control system comprising:
   a telescope having a primary mirror,
   a holographic element disposed on said primary mirror;
   a wavefront sensor in optical alignment with said holographic optical element;
   a processor operatively coupled to said wavefront sensor;
   an optical phased array operatively coupled to said processor;
   an aperture sharing element;
   a source of a reference beam adapted to illuminate said phased array and said aperture sharing element
   a first phase conjugate mirror in optical alignment with said reference beam;
   a second phase conjugate mirror in optical alignment with said reference beam; and
   an amplifier in optical alignment with said second phase conjugate mirror.

* * * * *